United States Patent
Hsu et al.

(10) Patent No.: US 6,813,148 B2
(45) Date of Patent: Nov. 2, 2004

(54) DRIVE BRACKET ASSEMBLY

(75) Inventors: Yuan-Lin Hsu, Tu-chen (TW); Li-Ping Chen, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/360,335

(22) Filed: Feb. 7, 2003

(65) Prior Publication Data

US 2004/0095717 A1 May 20, 2004

(30) Foreign Application Priority Data

Nov. 15, 2002 (TW) ..................................... 91218343 U

(51) Int. Cl.⁷ ............................................... G06F 1/16
(52) U.S. Cl. .................... 361/685; 361/725; 312/332.1; 312/333; 248/612; 248/560; 248/225.11
(58) Field of Search ........................ 361/685, 724–725; 312/332.1, 333; 248/609–612, 560, 581, 225.11, 291.1

(56) References Cited

U.S. PATENT DOCUMENTS

| | | | | |
|---|---|---|---|---|
| 5,680,293 A | * | 10/1997 | McAnally et al. | .......... 361/685 |
| 5,828,547 A | * | 10/1998 | Francovich et al. | ........ 361/685 |
| 6,018,457 A | * | 1/2000 | Mroz | .......................... 361/685 |
| 6,275,382 B1 | * | 8/2001 | Siedow et al. | .............. 361/727 |
| 6,370,022 B1 | * | 4/2002 | Hooper et al. | .............. 361/685 |
| 6,473,313 B1 | * | 10/2002 | Chen et al. | .................. 361/685 |
| 6,590,775 B2 | * | 7/2003 | Chen | ........................... 361/725 |
| 6,614,654 B2 | * | 9/2003 | Liu et al. | ..................... 361/685 |

* cited by examiner

*Primary Examiner*—Lisa Lea-Edmonds
(74) *Attorney, Agent, or Firm*—Wei Te Chung

(57) ABSTRACT

A drive bracket assembly includes a bracket (30) for receiving a disk drive (70) therein, an operating member (40) and a cover (60). The bracket includes first and second side panels (31), a pair of slots (36) is defined in the first and second side panels respectively, for slidably receiving respective screws (80) of the disk drive. An upper hook (34) is outwardly formed on the first side panel. A lower hook (48) is outwardly formed on the operating member. A spring (50) is engaged with the upper hook and the lower hook respectively. The operating member includes a concavity (49) adjoining the slot of the first side panel, for securely receiving one rear screw of the disk drive thereby the disk drive is securely retained in the bracket. The disk drive is withdrawn from the bracket by pressing the operating member to disengage said screw from the concavity.

18 Claims, 5 Drawing Sheets ns in the opposite sides of the main portion 42 respectively.

DRIVE BRACKET ASSEMBLY

BACKGROUND OF THE INVENTION

1. Field of the Invention

The present invention relates to a drive bracket assembly, and more particularly to a drive bracket assembly for easily and securely receiving a disk drive therein.

2. Description of the Related Art

Users and technicians alike require that a drive bracket allows easy and secure installation of a disk drive therein. The disk drive may be a hard disk drive (HDD), a floppy disk drive (FDD), or a compact disk read-only memory (CD-ROM) drive. The drive bracket should also permit the disk drive to be easily removed therefrom. Conventionally, a disk drive is secured to a drive bracket with screws. However, insertion and removal of screws is unduly time consuming and cumbersome.

To address above problem, devices have been developed which facilitate installation and removal of disk drives. One such device comprises two flat rectangular side pieces which are attached to opposite sides of the disk drive. Receiving rails are provided in a drive bracket, with the side pieces of the disk drive slidingly engaging in the receiving rails. However, the receiving rails are attached to the drive bracket using screws.

SUMMARY OF THE INVENTION

Accordingly, an object of the present invention is to provide a drive bracket assembly which enables easy and convenient installation and removal of a disk drive.

To achieve the above object, a drive bracket assembly in accordance with the present invention comprises a bracket for receiving a disk drive therein, an operating member, a cover and a spring. The bracket comprises first and second side panels, a pair of slots is defined in each of the first and second side panels, for slidably receiving respective screws of the disk drive. An upper hook is outwardly formed on the first side panel. A lower hook is outwardly formed on the operating member corresponding to the upper hook. The spring is engaged with the upper hook and the lower hook respectively. The cover is fixedly attached to the first side panel, and defines a space between the cover and the first side panel receiving the operating member therein. The operating member comprises a concavity adjoining the slot of the first side panel, for securely receiving one rear screw of the disk drive thereby the disk drive is securely received in the bracket. The disk drive is withdrawn from the bracket by pressing the operating member to disengage said screw from the concavity.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
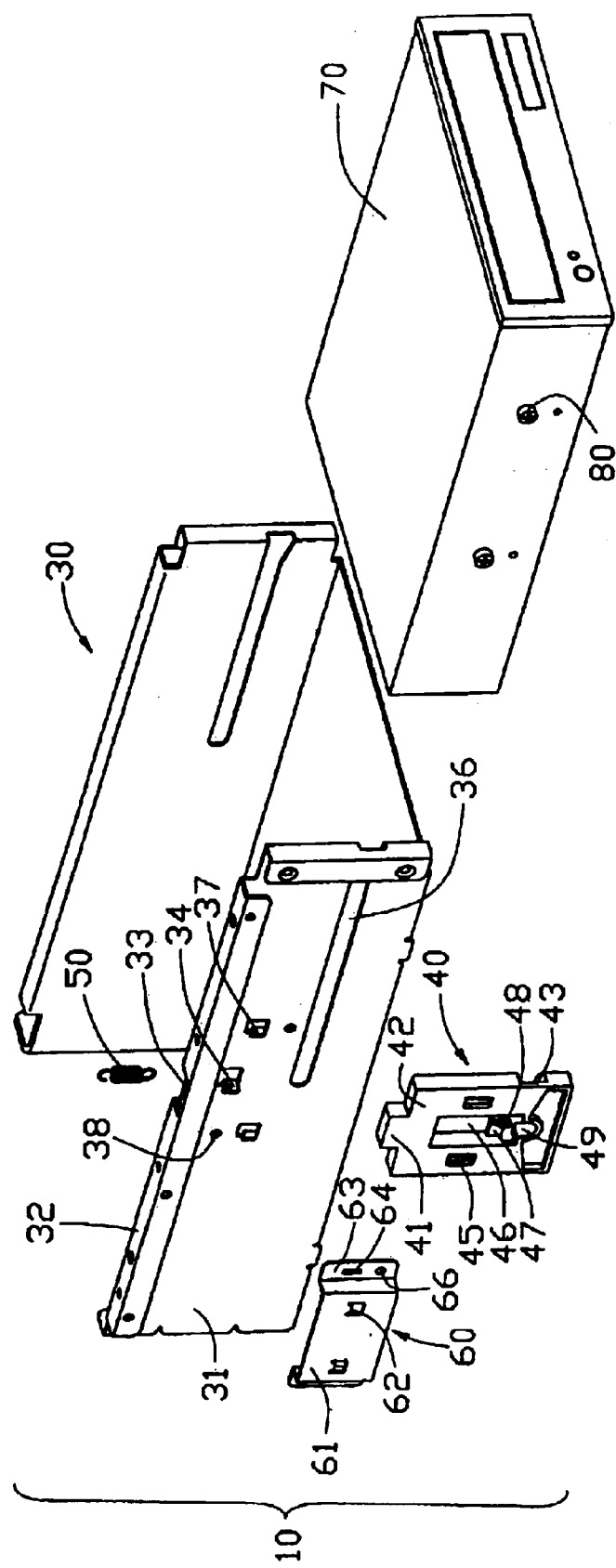
FIG. 1 is an exploded, isometric view of a drive bracket assembly in accordance with a preferred embodiment of the present invention together with a disk drive, the drive bracket assembly comprising a bracket, an operating member and a cover.

Referring to FIG. 1, a drive bracket assembly 10 of the present invention comprises a bracket 30, an operating member 40, a spring 50 and a cover 60. The bracket 30 is provided for housing a disk drive 70 such as a CD-ROM drive therein. A pair of aligned screws 80 is engaged in each of opposite sidewalls of the disk drive 70. Alternatively, other suitable protrusions may be provided at the opposite sidewalls of the disk drive 70, the protrusions performing the same function as the screws 80 as described below.

The bracket 30 comprises opposite first and second side panels 31. A bent plate 32 is first bent perpendicularly outwardly from a top edge portion of each side panel 31, and then bent perpendicularly downwardly. An aperture 33 is defined in a middle portion of a horizontal part of the bent plate 32 adjacent the first side panel 31. An upper hook 34 is stamped outwardly from the first side panel 31 below the aperture 33. A pair of spaced tabs 37 is outwardly formed from the first side panel 31, at opposite sides of the upper hook 34 respectively. A pair of holes 38 is defined in the first side panel 31 at opposite sides of the upper hook 34 respectively, and in general vertical alignment with the tabs 37 respectively. A pair of identical parallel slots 36 is defined in lower portions of the first and second side panels 31 respectively. The slot 36 of the first side panel 31 spans from a front edge of the first side panel 31 to a position below the upper hook 34.

Figure 2:
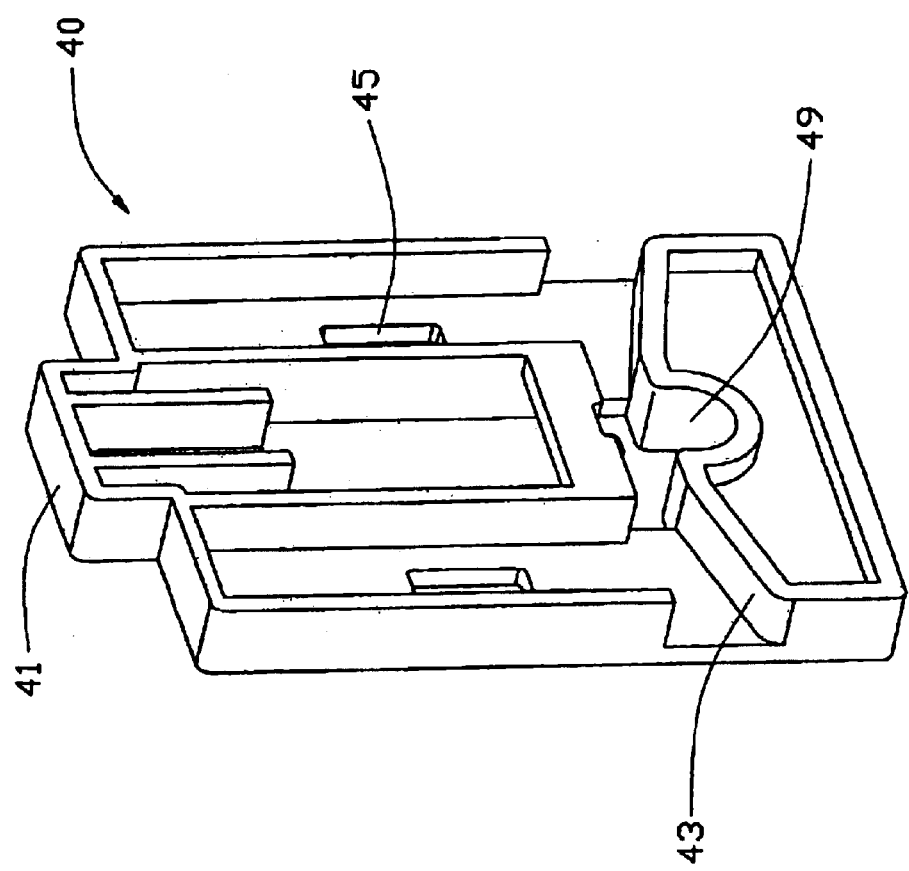
FIG. 2 is an enlarged view of the operating member of FIG. 1, but viewed from another aspect.

Referring to FIGS. 1 and 2, the operating member 40 is generally parallelepiped, and comprises a main portion 42 and a pressing portion 41 extending upwardly from a top of the main portion 42. The pressing portion 41 is movably received in the aperture 33 of the bracket 30. A vertical opening 46 is defined in the main portion 42. A crossbeam 47 is formed between two opposite sides of the main portion 42 at the opening 46, thereby separating the opening 46 into two portions. One portion of the opening 46 above the crossbeam 47 receives the upper hook 37 of the bracket 30. A lower hook 48 is outwardly formed from the crossbeam 47, and is generally symmetrically opposite to the upper hook 34. A coil spring 50 is engaged with the upper hook 34 and the lower hook 48 respectively. An arch-shaped concavity 49 is formed at a bottom of the main portion 42, adjoining a bottom portion of the opening 46. A pair of slanting slideways 43 is formed at an inner side face of the main portion 42, at opposite sides of the concavity 49 respectively. The slanting slideways 43 adjoin respective top portions of the concavity 49, and slope gently downwardly from said respective top portions to respective opposite sides of the main portion 42. A pair of slots 45 is defined in said two opposite sides of the main portion 42 respectively.

Referring particularly to FIG. 1, the cover 60 is formed by integrally bending a single plate. The cover 60 comprises a main portion 61, and a pair of flanges 63 extending from respective opposite sides of the main portion 61. A pair of spaced pins 62 is formed inwardly from the main portion 61, for being received in the slots 45 of the operating member 40. A pair of slots 64 is defined in the flanges 63 respectively, for receiving the tabs 37 of the bracket 30. A pair of holes 66 is defined in the flanges 63 adjacent the slots 64 respectively, corresponding to the holes 38 of the bracket 30. The cover 60 is attached to the first side panel 31, and defines a space between the main portion 61 and the first side panel 31 for receiving the main portion 42 of the operating member 40 therein.

Figure 3:
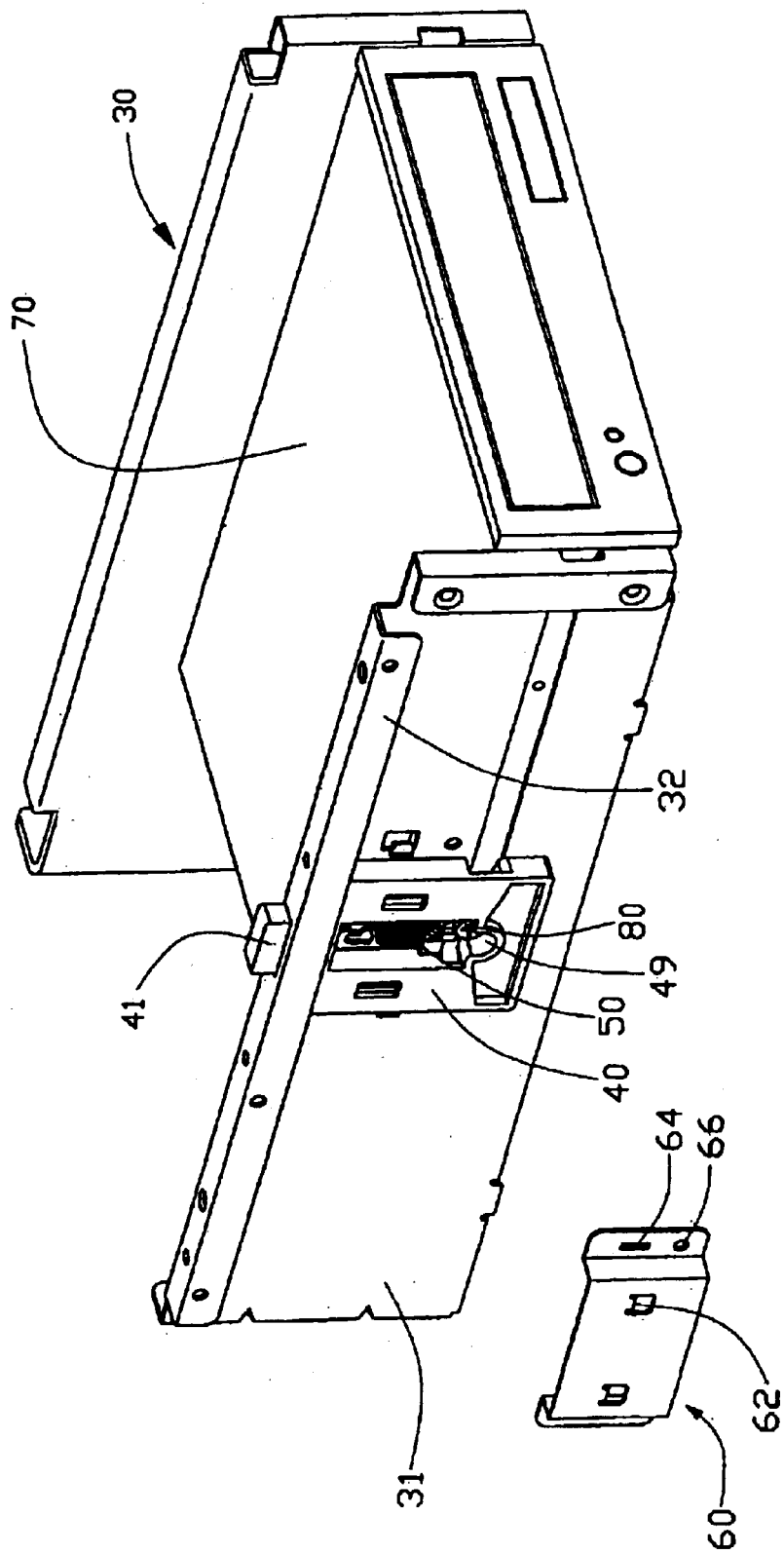
FIG. 3 is a partly assembled view of FIG. 1.
Figure 4:
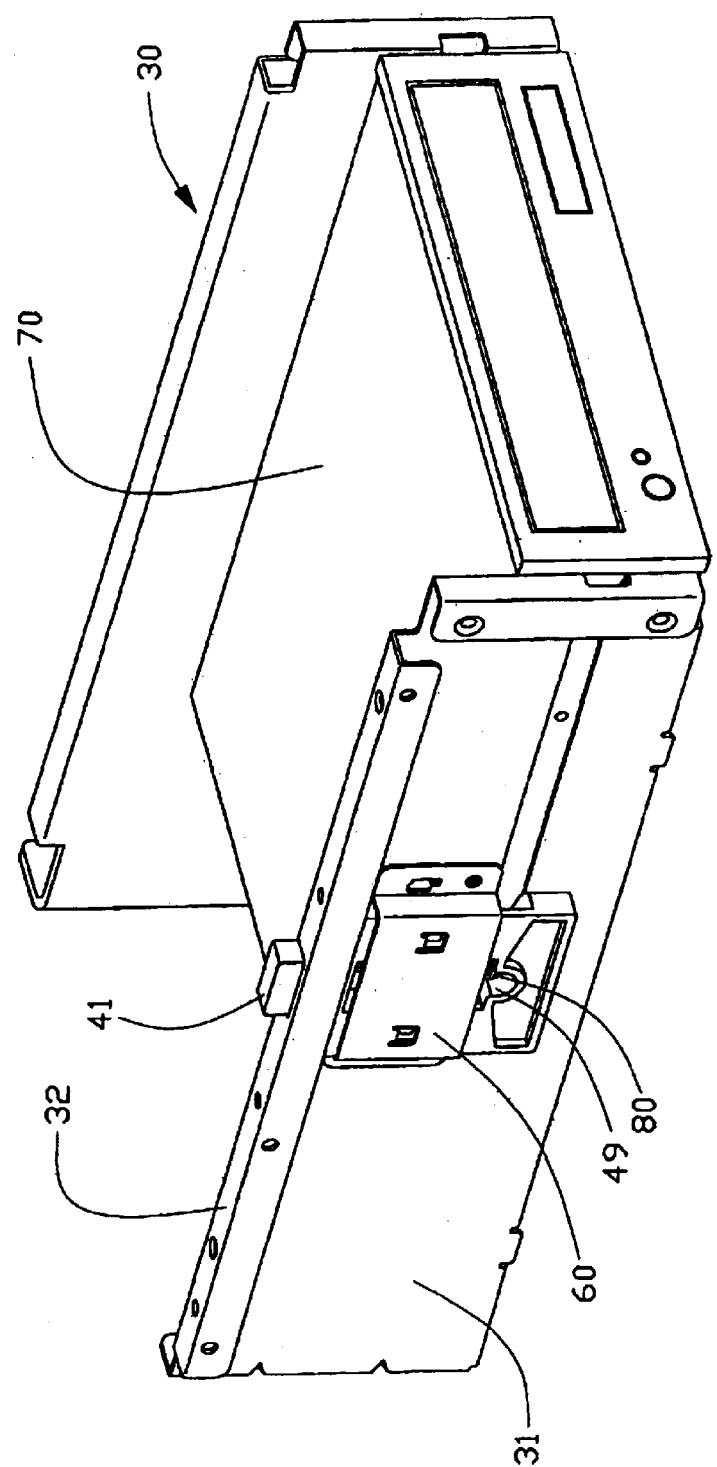
FIG. 4 is a fully assembled view of FIG. 1.
Figure 5:
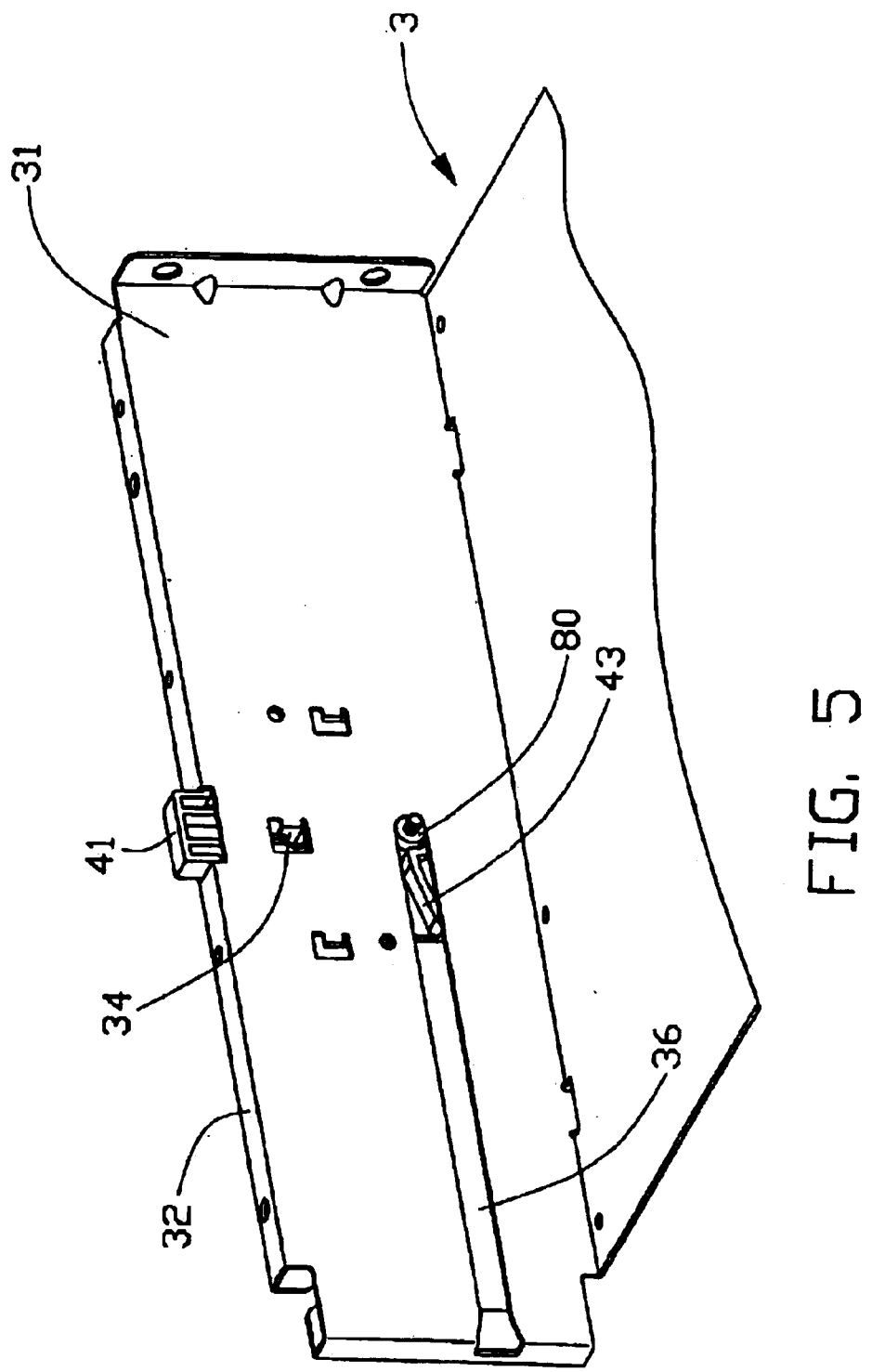
FIG. 5 is an isometric view of part of the bracket, the operating member and a screw of the disk drive of FIG. 1 assembled together, illustrating operation of the disk drive assembly.

Referring particularly to FIGS. 3 through 5, in assembly, the pressing portion 41 of the operating member 40 is extended upwardly through the aperture 33 of the bracket 30, and the upper hook 34 is received in the opening 46. The operating member 40 is then suspended below the bent plate 32, with opposite ends of the spring 50 being engaged with the upper hook 34 and lower hook 48 of the operating member 40 respectively. One of the slideways 43 adjoins the slot 36 of the first side panel 31, and the concavity 49 adjoins a rear end of the slot 36. Then the cover 60 is fixedly attached to the first side panel 31. The tabs 37 are engaged in the slots 64 of the cover 60 respectively. A pair of fastening means such as screws (not shown) is extended through the holes 38, 66 respectively, thereby fastening the flanges 63 to the first side panel 31. The pins 62 are received in the slots 45 of the operating member 40 respectively. The operating member 40 is thus slidably received in the space between the main portion 62 of the cover 60 and the first side panel 31.

The disk drive 70 is then received in the bracket 30. The disk drive 70 is pushed rearwardly, with the screws 80 sliding along the slots 36 respectively. One rear screw 80 reaches and slides along the slideway 43, and pushes the operating member 40 downwardly. This causes the spring 50 to be stretched downwardly. Said rear screw 80 passes beyond the slideway 43 to the concavity 49, simultaneously reaching the rear end of the slot 36. The operating member 40 rebounds upwardly under force of the spring 50 retracting back to its original position. The rear screw 80 is then retained at a bottom of the concavity 49 between the first side panel 31 at the rear end of the slot 36 and the concavity 49. The disk drive 70 is thus securely received in the bracket 30.

In disassembly, the pressing portion 41 is pressed downwardly, and the slideway 43 and the concavity 49 are accordingly moved below the slot 36. The disk drive 70 can then be easily withdrawn from the bracket 30. Thereupon, the spring 50 rebounds, and pulls the operating member 40 back up to its original position.

While the present invention has been illustrated by the above description of an embodiment thereof, and while the embodiment has been described in considerable detail, it is not intended to restrict or in any way limit the scope of the appended claims to such detail. Additional advantages and modifications will readily appear to those skilled in the art. Therefore, the present invention is not limited to the specific details and illustrative examples shown and described above.

What is claimed is:

1. A drive bracket assembly comprising:
a bracket adapted for receiving a disk drive therein, the bracket comprising first and second side panels, a slot defined in the first side panel for slidably receiving sliding means of the disk drive therein; and
an operating member movably attached to the first side panel of the bracket, the operating member comprising a concavity adjoining the slot for securely receiving the sliding means of the disk drive therein;
wherein the operating member is downwardly movable upon action of a force to release the sliding means from the concavity, and returns back to its original position after removal of the force.

2. The drive bracket assembly as claimed in claim 1, wherein an upper hook is arranged on the first side panel, a lower hook is arranged on the operating member, and a resilient member connects between the lower hook and the upper hook.

3. The drive bracket assembly as claimed in claim 2, wherein the resilient member is a spring.

4. The drive bracket assembly as claimed in claim 2, wherein the operating member comprises a main portion and a pressing portion, and the bracket comprises a bent plate bent from the first side panel, an aperture being defined in the bent plate movably receiving the pressing portion.

5. The drive bracket assembly as claimed in claim 4, wherein an opening is defined in the main portion of the operating member receiving the upper hook therein.

6. The drive bracket assembly as claimed in claim 5, wherein the concavity adjoins a bottom portion of the opening, a slideway extends from the concavity, and the slideway adjoins the slot of the first side panel so that the sliding means of the disk drive slides along the slideway to reach the concavity.

7. The drive bracket assembly as claimed in claim 1, wherein the disk drive assembly further comprises a cover attached to the first side panel, and a space is defined between the cover and the first side panel receiving the operating member therein.

8. The drive bracket assembly as claimed in claim 7, wherein a plurality of pins extends inwardly from the cover, and a plurality of slots is defined in the operating member movably receiving the pins therein.

9. A disk drive assembly comprising:
a disk drive;
a bracket comprising first and second panels;
means for sliding the disk drive into the bracket;
an operating member movably attached to the first side panel of the bracket, the operating member comprising a concavity; and
a resilient member connecting between the operating member and the bracket;
wherein the resilient member cooperates with the concavity to securely attach the disk drive in the bracket.

10. The disk drive assembly as claimed in claim 9, wherein the sliding means comprises at least one screw and at least one slot slidably receiving the at least one screw.

11. The disk drive assembly as claimed in claim 10, wherein the at least one screw is attached to one side of the disk drive, and the at least one slot is defined in the first panel of the bracket.

12. The disk drive assembly as claimed in claim 11, wherein the concavity adjoins the at least one slot, and the at least one screw is slidable into the concavity to be securely retained therein.

13. The disk drive assembly as claimed in claim 12, wherein when the operating member is manipulated to move the concavity away from the at least one slot, the disk drive can be withdrawn from the bracket whereupon the resilient member drives the operating member back to an original position.

14. The disk drive assembly as claimed in claim 9, wherein an upper hook is arranged on the first side panel, and a lower hook is arranged on the operating member, and the resilient member connects between the lower hook and the upper hook.

15. A disk drive assembly comprising:
a bracket including two side panels defining a space therebetween;

a guiding slot formed in at least one of said two panels and extending along a front-to-back direction thereof;

a disk drive moveably received in the space along said front-to-back direction;

a projection located on the disk drive and receivably moveable along said guiding slot; and an operation member associated with said at least one of said two panels, said operation member moveable relative to the said at least one of the two panels in a non-parallel relation with regard to said front-to-back direction; wherein said operation member does not block the guiding slot and allows the projection to move in said front-to-back direction along said guiding slot when said operation member is in a first position, while blocks the guiding slot and prevents the projection from moving in said front-to-back direction along said guiding slot when said operation member is in a second position.

16. The assembly as claimed in claim 15, wherein said operation member is moveable between the first and second positions in a direction perpendicular to said front-to-back direction.

17. The assembly as claimed in claim 15, further including means for urging said operation member to be in the second position.

18. The assembly as claimed in claim 15, wherein said operation member includes means for retainably receiving said projection when said operation member is in the second position.

* * * * *